April 7, 1959
J. KUŽELA ET AL
2,880,456
DEVICE FOR THE PRODUCTION OF A LIGHT FILLING FROM
BLAST FURNACE, BOILER AND OTHER SLAG
Filed April 8, 1957
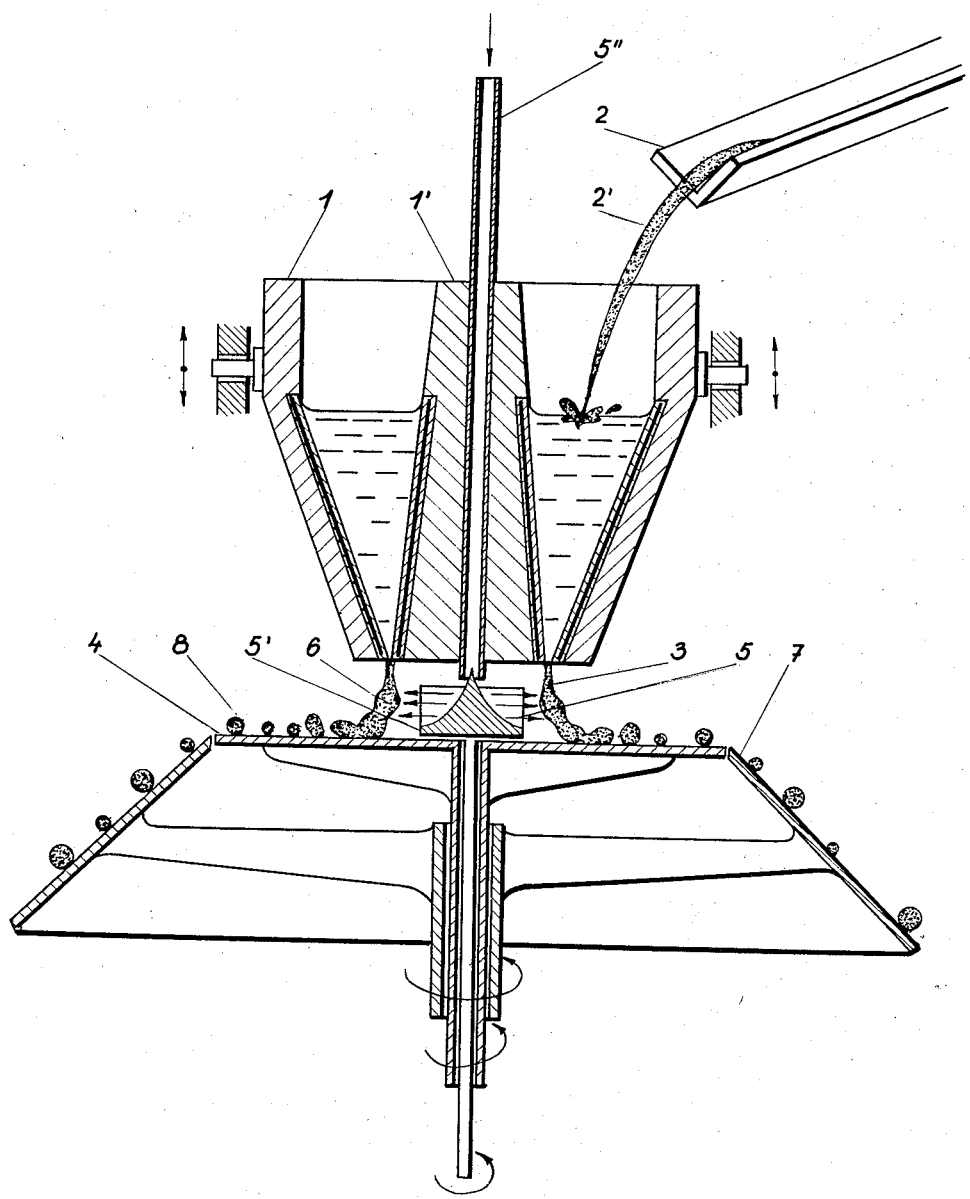
INVENTORS
Jan Kužela, František Vavřín
BY
Richard Low
ag't

2,880,456
DEVICE FOR THE PRODUCTION OF A LIGHT FILLING FROM BLAST FURNACE, BOILER AND OTHER SLAG

Jan Kužela and František Vavřín, Gottwaldov, Czechoslovakia

Application April 8, 1957, Serial No. 651,458

Claims priority, application Czechoslovakia April 9, 1956

5 Claims. (Cl. 18—2.6)

The present invention relates to a device for the production of light pumice from blast furnace, boiler or other slag; the device according to the invention may quickly and without any interruption of operation be adjusted or controlled according to the varying properties of the outflowing slag.

The hitherto known devices for frothing blast furnace slag are relatively inefficient and yield very brittle pumice or are costly or require large working spaces, which latter fact does not permit the devices to be arranged in the immediate vicinity of the blast furnaces. A considerable disadvantage of the known devices is further their inability to be adjusted with sufficient speed to the varying properties of the outflowing slag, which results in the slag becoming highly non-uniform. The majority of the known devices, either directly or after the indispensable crushing of the large pieces, yields granules with sharp edges, which are difficult to compact and require large quantities of cement, when used for the preparation of concrete.

All the above disadvantages are removed by the present invention, the essence of which resides in that liquid blast furnace, boiler or other slag is made to flow in an adjustable quantity in the shape of a hollow cylinder upon a disc rotating with a controlled speed. The outflowing slag is frothed by water or a mixture of water and steam or water and air or water and suitable filling agents (e.g. fly ash), the frothing agent being injected from the interior of the referred to hollow cylinder of liquid slag. Then the frothed slag is disrupted and torn to pieces by the rotational and centrifugal force of a rotating disc which at the same time imparts a rotational movement to the slag particles obtained. During this operation the particles are rolled by the centrifugal force and thus formed substantially into the shape of balls with practically closed surfaces.

It is an advantage of the invention that the degree of frothing may be suitably and continuously adjusted as the properties of the slag vary, either by increasing the liquidity of the slag by heating the latter in the storage tank or by varying the quantity of the outflowing slag or the quantity and velocity of the injected water or mixture of water and the above mentioned substances or by varying the velocity of the revolving disc. Further rounding and cooling of the slag particles takes place on the surface of a truncated cone provided below the revolving disc and also revolving with controlled speed.

The accompanying drawing shows in a diagrammatic sectional view a device according to the invention.

A storage tank for the slag consists of two parts 1 and 1', one or both of which are adapted for axial displacement, the storage tank being filled with liquid slag 2' by means of a trough 2. The slag 2' flowing out from the lower portion of the storage tank forms a hollow slag cylinder 3 of adjustable width and height according to the varying relative displacement of the parts 1 and 1' of the storage tank, the hollow slag cylinder 3 flowing continuously down on a disc 4 revolving with controlled speed. Water 5 or a mixture of water and the above named substances is continuously introduced into this hollow slag cylinder 3 from the inside thereof against the inner wall of the slag cylinder, the water or mixture being supplied into a distributor 5' through a pipe 5". The outflowing slag becomes thus frothed. The frothed slag 6 is then torn to pieces by the revolving disc 4, rotating with controlled speed, brought into rotary movement, and at the same time rolled towards the circumference of the disc.

Frothed slag granules 8 are in this way produced from the foamy slag 6, said granules having substantially the shape of little balls with a practically closed surface. The particles proceed then towards the jacket of a truncated cone 7, revolving with controlled speed in the same or opposite direction, where the granules are further rounded and cooled down so as to prevent their possible deformation, when reaching a storage space.

The operation of the device for the production of slag pumices is as follows:

A hollow slag cylinder is discharged from a storage tank which may be heated, if required, and consists of two displaceable parts 1 and 1', the said hollow slag cylinder having a suitable width, depth and height, the slag being frothed with water 5 or a mixture of water and the above quoted substances, injected from the interior of the cylinder. The frothed slag 6 is torn to pieces and rounded by means of the disc 4 revolving with a suitable velocity. The frothed granules of a substantially round shape with a practically closed surface 8 are then further rounded and cooled, while moving down over a truncated cone 7 revolving with an adjustable speed.

An advantage of the device according to the invention, apart from the above mentioned possibility of a quick and general control of the properties of the produced light slag even when the nature of the slag changes, is to be seen in the small dimensions of the device, in the inexpensiveness of the device, and in the fact that it may be placed in the immediate vicinity of the blast furnace. A further advantage lies in the fact that the device does not require any cleaning and that merely by shutting off the water supply it may be used in connection with a slag unsuitable for frothing to produce a non-frothed slag filling for normal concrete and iron concrete.

We claim:

1. A device for the production of a light filling from blast furnace, boiler and other slag, comprising a storage tank for liquid slag, the tank having an adjustable annular outlet to discharge the slag substantially in the shape of a hollow cylinder, means for injecting a liquid against the inner wall of the hollow slag cylinder, a disc spacedly mounted for rotation underneath the said outlet to receive and tear to pieces the slag received, means for varying the speed of rotation of the said disc, a truncated cone mounted for rotation underneath the disc and adapted to receive the torn slag particles and to impart a rolling movement to said particles, and means for varying the speed of rotation of the truncated cone.

2. In the device according to claim 1, the storage tank being formed by two parts, an outer wall and a body centrally and axially extending within the outer wall, the two parts confining a container space of annular shape, when viewed in any cross section, and being formed so as to narrow the container space toward said outlet, at least one of the parts being arranged for axial displacement relative to the other part.

3. In the device according to claim 2, the body being provided with an axially extending bore for the introduction of said liquid to the interior of the hollow slag cylinder.

4. In the device according to claim 1, means to vary the amount and velocity of the injected liquid.

5. In the device according to claim 1, means for shutting off the liquid to be injected against the inner wall of the slag cylinder.

References Cited in the file of this patent

UNITED STATES PATENTS 2,739,348     Rayburn _____ Mar. 27, 1956

FOREIGN PATENTS 457,707     Great Britain _____ Dec. 3, 1936